United States Patent [19]
Horiie et al.

[11] 3,939,224
[45] Feb. 17, 1976

[54] BLOCK COPOLYMERS FOR A SHEET OR FILM

[75] Inventors: Shigeki Horiie, Yokohama; Shin-Ichiro Asai; Yoshihisa Moriya, both of Tokyo, all of Japan

[73] Assignee: Kenki Kagaku Kogyo Kasushiki Kaisha, Tokyo, Japan

[22] Filed: Dec. 10, 1973

[21] Appl. No.: 423,617

[52] U.S. Cl............ 260/880 B; 260/879; 260/83.7; 260/80 P
[51] Int. Cl.$^2$.................. C08F 236/00; C08F 4/46
[58] Field of Search............... 260/880 B, 879, 83.7

[56] References Cited
UNITED STATES PATENTS

| | | | |
|---|---|---|---|
| 3,149,182 | 10/1957 | Porter | 260/879 |
| 3,287,333 | 12/1961 | Zelinski | 260/837 |
| 3,703,567 | 11/1972 | Sutter | 260/880 B |

OTHER PUBLICATIONS

"Preparation of Block Copolymers," Robert P. Zelinski, U.S. application (abandoned) No. 721,293.
"On the Graft–and Block Copolymers from Synthetic and Natural Macromolecules" by E. H. Immergut and H. Mark, Makromolekulare Chemie 18–21, 322–341 (1956).

*Primary Examiner*—Joseph L. Schoter
*Assistant Examiner*—F. R. Cervi
*Attorney, Agent, or Firm*—Sughrue, Rothwell, Mion, Zinn & Macpeak

[57] ABSTRACT

First polymerization of a mixture of styrene-type monomers and conjugated diene monomers containing 30 to 70% by weight of styrene-type monomers is carried out, and when 40 or more of the diene monomers have been converted to a copolymer, there are then added styrene-type monomers in such an amount that the content of styrene units accounts for a proportion of 70 to 85% by weight of the finally obtained block copolymers, followed by completion of the polymerization. Alternatively, when all the diene monomers added have been converted to the copolymer, the second polymerization of styrene type monomers is carried out in the presence of a small amount of conjugated dienes as a polymerization retardant. Block copolymers obtained thus are useful for sheet or film molding having good low-temperature impact strength.

5 Claims, No Drawings

BLOCK COPOLYMERS FOR A SHEET OR FILM

BACKGROUND OF THE INVENTION

The present invention relates to a process for the preparation of block copolymers for a sheet of film comprising a styrene-type hydrocarbon (hereinafter referred to as "styrene") and a conjugated diene hydrocarbon (hereinafter referred to as "diene").

It is well known that various types of block copolymers of styrene and diene units can be obtained with use of an organolithium compound as a polymerization initiator. For instance, U.S. Pat. No. 3,287,333 discloses a process for producing block copolymers from a mixture of a conjugated diene and a vinyl-type aromatic hydrocarbon with Li-initiators. Also, U.S. Pat. No. 3,629,387 teaches rubber-modified, impact-resistant polystyrene films made of a block copolymer of styrene and conjugated diene units.

Among the block copolymers, the present invention is particularly directed to a resinous block copolymer for a sheet or film containing 70 to 85% by weight of styrene units.

Processes for the preparation of block copolymers of styrene and diene with use of organolithium compounds as a polymerization initiator may be classified broadly into the two types:

1. polymerizing in regular sequence styrene and diene monomers.

2. polymerizing a mixture of styrene and diene monomers in a non-polar solvent to obtain copolymers similar to perfect block copolymers obtained in method (1).

The resinous block copolymers obtained according to method (1) do not show well balanced properties with respect to transparency, tensile strength, tensile elastic modulus and low-temperature impact strength when formed into a sheet. On the other hand, the resinous block copolymers according to method (2), when formed into the sheet, are superior in transparency, tensile strength and tensile elastic modulus to those of method (1). It has been, however, impossible to obtain sheets having a practically satisfactory low-temperature impact strength according to method (2).

SUMMARY OF THE INVENTION

An object of the invention is to provide improvements in polymerization method (2) mentioned above, and particularly, in preparing resinous block copolymers for molding sheets having an increased low-temperature impact strength.

In the preparation of block copolymers from a mixture of styrene and diene monomers in a non-polar solvent with use of organolithium compounds as an initiator, block copolymers for molding a sheet for film with good low-temperature impact strength are obtained by effecting a first polymerization of a mixture of styrene and diene monomers containing 30 to 70% by weight of styrene, then adding styrene monomers in such an amount that the content of styrene units accounts for the proportion of 70 to 85% by weight of the finally obtained block copolymer when 40% or more of the diene monomers added have been converted to a copolymer, and completing the polymerization.

Alternatively, when all the diene monomers added have been converted to a copolymer, styrene monomers containing 0.01 to 3.0% by weight of dienes are added in such an amount that the content of styrene units accounts for the proportion of 70 – 85% by weight of the finally obtained block copolymer, and the polymerization is effected to completion.

DETAILED DESCRIPTION OF THE INVENTION

The polymerization reaction is carried out in a non-polar solvent in the presence of polyfunctional organolithium compounds as a polymerization initiator. First, a mixture of diene and styrene monomers containing 30 – 70 weight % of styrene monomers is polymerized and at the time when 40% or more of the diene monomers added were converted to the copolymer, there are then added styrene monomers in such an amount that the content of styrene units accounts for the proportion of 70 to 85% by weight of a finally obtained block copolymer.

In the copolymerization of styrene and diene monomers, the polymerization reaction arises on the lithium atoms of the polyfunctional organolithium compound and copolymer chains corresponding to the number of active lithium atoms grow. The copolymerization of styrene and diene monomers proceeds in accordance with the copolymerization reactivity ratio. In this case the diene monomers are selectively polymerized in the first place and polymer chains copolymerized with an extremely small quantity of styrene are formed. The proportion of styrene units in the copolymer increases as the polymerization proceeds. Styrene monomers are then added at any time when 40% or more of the diene monomers added have been converted to the copolymer, and the copolymerization is effected to completion. At the end of the copolymerization, polymers substantially consisting of styrene are growing and consequently, polymer chains of which the terminal parts are composed of styrene units are formed.

As mentioned above, the mixture of diene and styrene monomers for the first polymerization should contain 30 to 70% by weight of styrene. If the amount of styrene is outside this range, block copolymers obtained are not improved in low-temperature impact strength when formed into sheets. In the case of not more than 30% by weight styrene copolymers similar to those of method (1) mentioned hereinbefore are obtained, whereas in the case of more than 70% by weight styrene polymers similar to those of method (2) mentioned hereinbefore are formed.

A further feature of the invention is that the styrene feed for the second polymerization must be added at a time when 40% or more of the diene monomers added have been converted to the copolymer. If the styrene feed is added at the time of conversion of diene monomers to copolymer of not more than 40%, the obtained block copolymers are inferior in transparency, tensile strength, tensile elastic modulus and low-temperature impact strength when formed into sheets, as demonstrated in the succeeding Examples. Even after all the dienes added have been converted to the copolymer, styrene monomers may be added into the second polymerization zone provided that stirring can be sufficiently effected therein so as to obtain an uniform polymerization mixture. In many cases, however, it is difficult to ensure stirring in a commercial-scaled reactor and therefore the styrene monomers added begin to polymerize prior to the formation of the uniform polymerization mixture. Accordingly, it is preferred to add the styrene monomers while diene monomers still remain in the polymerization zone, i.e. at a time of a conversion of dienes to polymer of less than 100%. This is due to the fact that the diene monomers act as a polymerization retardant as mentioned hereinafter.

Furthermore, the amount of the additional styrene monomers should be such that the content of styrene units accounts for the proportion of 70 to 85% by weight, preferably about 73 to 82% by weight, of the finally obtained block copolymer. With less than 70% by weight of the styrene units, the block copolymer is lowered in tensile elastic modulus and bending elastic modulus when formed into sheets, whilst with more than 85% by weight the low-temperature impact strength is not appreciably further improved.

The copolymerization of diene and styrene monomers with use of the organolithium compound proceeds at a relatively slow velocity. However, when substantially all of the diene monomers have polymerized and thus only the styrene monomers have been left, the polymerization of styrene only proceeds at an extremely high velocity. For this reason, and particularly in the case of using a polymerization vessel with a large capacity, when only the styrene monomers are added to the polymerization zone under such conditions, the polymerization proceeds before the styrene monomers are uniformly dispersed therein, so that uniform copolymers can not be obtained with good reproducibility.

We have found that such disadvantages can be overcome by adding small amounts of dienes prior to the addition of styrene thereby to retard the polymerization reaction. It has, further, been confirmed that the dienes act as a polymerization retardant, but no deactivation of active polymer terminals and chain-transfer occur, and further the addition of dienes exhibits no bad influence upon physical or mechanical properties of the block copolymer for sheet molding. The dienes as retardant may be also added in mixture with the additional styrene monomers.

The amount of dienes added is within the range of 0.01 to 3.0% by weight, preferably 0.1 to 2.0% by weight, based on the additional styrene monomers. With less than 0.01% by weight, little retarding effect is exhibited, whilst it is meaningless to retard the polymerization of styrene beyond the limit of need by adding more than 3.0% by weight. The amount of dienes may vary depending on the capacity of reactors and the polymerization conditions.

The poly-functional organolithium compounds used as the initiator in the invention may be represented by the formula, R(Li)x wherein R is an organic radical and $x$ is an integer of 2 or more, and they preferably, are soluble in a non-polar, organic solvent. Typical examples of such an initiator are butadiene oligomer dilithium compounds wherein the lithium atoms are bonded to two terminals of butadiene oligomer. The butadiene oligomer dilithium compounds may be represented by the formula, Li — (Bu)y — Li wherein Bu is a butadiene unit and $y$ is an integer of 2 or more. When $y$ is 5 or more, the butadiene oligomer dilithium compounds become soluble in a non-polar solvent.

Examples of the non-polar organic solvent include aliphatic hydrocarbons such as butane, pentane or heptane, alicylic hydrocarbons such as cyclohexane or cycloheptane, and aromatic hydrocarbons such as benzene, toluene or xylene, and mixtures thereof.

Styrene-type hydrocarbons which may be used are aromatic hydrocarbons such as styrene and α-methylstyrene. Conjugated dienes used are conjugated diolefins such as butadiene and isoprene.

The sheets made from the block copolymer of the invention show an excellent transparency and a high elongation as compared with those made from the conventional styrene/butadiene type resins having an impact resistance, and moreover are particularly superior in low-temperature impact strength.

As for the conventional polystyrene-type sheet having transparency comparable to the copolymer sheet according to the invention, there are biaxially oriented polystyrene sheets. These sheets have a low impact strength of 3 to 6 kg·cm/cm$^2$ (a DIN impact value) at −20°C, which is not a sufficient impact strength for practical sheets. On the contrary, sheets of the block copolymer obtained according to the invention have a high impact strength of 30 to 50 kg·cm/cm$^2$ (a DIN impact value) at −20°C so that they can be in practice used, for example, in packing a refrigerated food-stuff. Besides having a good low-temperature impact strength as mentioned above, the block copolymer sheets according to the invention have a transparency and tensile strength comparable to polystyrene sheet so that they are very valuable in practice.

The invention is illustrated by the non-limitative examples to follow.

EXAMPLE 1

1. Preparation of block copolymer

To a 2l reactor which had been flushed with nitrogen gas and perfectly dried were added 500 ml of a purified and dehydrated benzene, 10g of a purified and dehydrated styrene and 21g of butadiene, and further 1.6 millimols of butadiene oligomer dilithium as an initiator. The polymerization solution was maintained at temperatures of 50° to 80°C for 78 minutes while stirring and 73g of a purified and dehydrated styrene was added when the conversion of butadiene monomer to polymer reached to 78%. A polymerization reaction was continued up to the substantial completion. When the polymerization mixture after completion of the reaction was poured into a large amount of methanol, the copolymer was isolated from the polymerization mixture and then dried in a vacuum drier overnight. The above-mentioned experiment is referred to as Run No. 1.

Experiments conducted in the same procedure as Run No. 1 varying the monomer feed ratio for the first polymerization and the amount of additional monomers are indicated in Table 1.

The initiator used herein was butadiene oligomer dilithium represented by the formula, Li — (Bu)y — Li wherein $y$ averages 6.

The conversion ratio of butadiene monomers to polymer was determined by sampling the polymerization solution, isolating the copolymer therefrom and measuring a refractive index of the copolymer.

Table 1

| Run No. | First Polymerization | | Second Polymerization | | Styrene Content of Copolymer (Weight %) | |
|---|---|---|---|---|---|---|
| | Styrene (g) | Butadiene (g) | Styrene *1 (g) | Conversion (%) | | |
| 1 | 10 | 21 | 73 | 78 | 79 | The |
| 2 | 21 | 22 | 57 | 100 | 78 | inven- |
| 3 | 28 | 19 | 53 | 57 | 81 | tion |
| 4 | 11 | 29 | 68 | 79 | 73 | |
| 5 | 35 | 10 | 45 | 78 | 90 | |
| 6 | 26 | 34 | 43 | 63 | 67 | Control |
| 7 | 13 | 13 | 74 | 81 | 87 | |
| 8 | 79 | 21 | — | — | 79 | |
| 9 | 21 | 22 | 57 | 30 | 78 | |

*1 Styrene was added when the conversion ratio of butadiene monomers to polymer reached the indicated values.

2. Measurement of physical and mechanical properties

The block copolymer obtained by the polymerization formulation as indicated in Table 1 was incorporated with 0.5 weight % of a phenolic anti-oxidant, pelletized by means of a 20 mm$\phi$ extruder, and formed into a specimen with 80 mm × 10 mm × 2 mm in dimensions by means of a small-sized injection molding machine. The results of measuring the physical and mechanical properties are given in Table 2, wherein the Run Nos. are the same as those indicated in Table 1.

Table 2

| Run No. | Tensile Strength *1 kg/cm² | Elongation *2 | Impact Strength *3 kg.cm/cm² | | Tensile Elastic Modulus *4 kg/cm² | |
|---|---|---|---|---|---|---|
| | | | 20°C | −20°C | | |
| 1 | 256 | 260 | 92 | 38 | 9760 | The |
| 2 | 263 | 255 | 95 | 40 | 9680 | inven- |
| 3 | 272 | 245 | 93 | 37 | 9730 | tion |
| 4 | 357 | 110 | 37 | 9 | 9930 | |
| 5 | 245 | 250 | 81 | 8 | 8220 | |
| 6 | 181 | 360 | 83 | 46 | 7430 | Con- |
| 7 | 377 | 150 | 26 | 7 | 9260 | trol |
| 8 | 267 | 270 | 96 | 10 | 8010 | |
| 9 | 271 | 247 | 71 | 7 | 8570 | |

*1 Measured according to JIS K-6782
*2 Measured according to JIS K-6872
*3 DyneStat Impact Strength according to DIN 53453, determined by fixing a specimen, striking same with a hammer and measuring an absorbed impact energy per a unit sectional area.
*4 JIS K-6745. Determined by punching a sheet in the machine direction to form a specimen, subjecting it to tensile test and measuring a stress per a unit sectional area at the time of an elongation of 2.5%.

It is clear from Table 2 that Run Nos. 1, 2 and 3 according to the invention showed high impact strength at a low temperature of −20°C as well as mechanical properties well-balanced with regard to tensile strength, elongation and tensile elastic modulus.

Run Nos. 4 and 5 of which the first polymerization feeds are outside the range of the monomer ratios defined in the invention showed an extremely low impact strength at −20°C.

Moreover, with respect to Run Nos. 6 and 7 are outside the range of the total styrene content defined in the invention: Run No. 6 showed a decreased tensile strength and tensile elastic modulus, and Run No. 7 showed a remarkably reduced low-temperature impact strength.

Furthermore, Run No. 8 was directed to the preparation of a block copolymer according to a one-step polymerization method and Run No. 9 was the case wherein the conversion of butadiene monomers to polymer was 30%, both the Run Nos. 8 and 9 showed an extremely reduced low-temperature impact strength.

EXAMPLE 2

This was effected for comparison with the invention.

1. Preparation of copolymer

A three-step block copolymerization of styrene - butadiene-styrene was conducted in benzene with use of sec-butyl lithium as a mono-functional initiator.

In each step, when all the monomers added were completely converted to a polymer, monomers for the subsequent polymerization are added. The reaction temperature was maintained at the same range as in Example 1.

The polymer was isolated from the polymerization mixture, dried and formed into a testing specimen, according to the procedures of Example 1.

The obtained polymers were identified with the following:

| Run No. | Molecular Structure | Styrene Content |
|---|---|---|
| 10 | St(80,000) - Bu(40,000) - St(80,000) | 80 |
| 11 | St(75,000) - Bu(50,000) - St(75,000) | 75 |

St is a styrene homopolymer block and Bu a butadiene homopolymer block, and the bracketed passages represent a molecular weight.

2. Measurement of physical and mechanical properties

The results of the tests effected in the same manner as in Example 1 are given in Table 3.

Table 3

| Run No. | Tensile Strength kg/cm² | Elongation | Impact Strength kg.cm/cm² | | Tensile Elastic modulus kg/cm² |
|---|---|---|---|---|---|
| | | | 20°C | −20°C | |
| 10 | 399 | 15 | 7 | 5 | 11500 |
| 11 | 265 | 55 | 25 | 7 | 7200 |

Table 3 shows that the sheets of Run Nos. 10 and 11 gave a remarkably decreased elongation and impact strength.

EXAMPLE 3

To a 2l reactor which had been flushed with nitrogen gas and perfectly dried were added 500 ml of a purified and dehydrated benzene and 1.0 millimol of butadiene oligomer dilithium and further 25g of a purified and dehydrated styrene and 25g of butadiene. A polymerization was continued to completion while maintaining the temperature at 50° – 80°C. Thereafter, 50g of a mixture of styrene and butadiene containing 0.01% by weight of butadiene were added while maintaining the temperature of the polymerization zone at 50°C. The time of up to starting of a homopolymerization of styrene added was 10 seconds. This was determined by a rising temperature of the polymerization mixture.

Varying a butadiene or isoprene content of the monomer feed for the second polymerization as indicated in Table 4, experiments were conducted in the same procedure as the foregoing. Likewise, the time of up to starting of a homopolymerization of styrene added was measured as given below.

Table 4

| Run No. | First Polymerization | | Second Polymerization | | Polymerization * Retarding Time |
|---|---|---|---|---|---|
| | Styrene g | Butadiene g | Styrene g | Diene g(%) | |
| 12 | 25 | 25 | 50.00 | Butadiene 0.005 (0.01) | 10 seconds |
| 13 | 25 | 25 | 49.95 | Butadiene 0.05 (0.1) | 30 seconds |
| 14 | 25 | 25 | 49.50 | Butadiene 0.50 (1.0) | 5 minutes |
| 15 | 25 | 25 | 49.00 | Butadiene 1.0 (2.0) | 11 minutes |
| 16 | 25 | 25 | 47.50 | Butadiene 2.50 (5.0) | 15 minutes |
| 17 | 25 | 25 | 49.50 | Isoprene 0.50 (1.0) | 30 seconds |
| 18 | 25 | 25 | 47.50 | Isoprene 2.50 (5.0) | 2 minutes |

*A homopolymerization of styrene monomers added in the second step proceeded rapidly and therefore, temperatures of the polymerization zone started to rise. The polymerization retarding time was determined by plotting this relationship with the lapse of time and measuring an interval between the time of addition of styrene and the time at which a temperature started to rise.

Next, results of the physical and mechanical properties tested in the same manner as in Example 1 are given in Table 5.

Table 5

| Run No. | Tensile Strength kg/cm² | Elongation % | Impact Strength kg.cm/cm² | | Tensile Elastic Modulus kg/cm² |
|---|---|---|---|---|---|
| | | | 20°C | −20°C | |
| 12 | 251 | 247 | 92 | 43 | 9,460 |
| 13 | 247 | 251 | 90 | 41 | 9,520 |
| 14 | 245 | 257 | 96 | 46 | 9,410 |
| 15 | 242 | 263 | 91 | 44 | 9,380 |
| 16 | 235 | 270 | 92 | 48 | 9,330 |
| 17 | 246 | 260 | 95 | 45 | 9,510 |
| 18 | 238 | 265 | 98 | 47 | 9,420 |

It is clear from Table 5 that the block copolymer sheets according to the invention gave a remarkably improved low-temperature impact strength as well as well-balanced mechanical properties.

What is claimed is:

1. A block copolymer comprising 70 – 85% by weight of a styrene-type unit and 15 – 30% by weight of a conjugated diene unit prepared from a mixture of styrene-type monomers and conjugated diene monomers in a non-polar organic solvent with use of a poly-functional organolithium compound as an initiator, said mixture containing 30 – 70% by weight of said styrene-type monomers, wherein a first polymerization is effected, after which additional styrene-type monomers are added in such amount that the content of styrene units accounts for the proportion of 70 to 80% by weight of the finally obtained block copolymer when 40% or more of the diene monomers added have been converted to a copolymer, and effecting a polymerization to completion.

2. A block copolymer according to claim 1, wherein said additional styrene-type monomers are added at the time of a conversion of diene monomers to copolymer being not less than 40% and less than 100%.

3. A block copolymer according to claim 1, wherein the initiator is butadiene oligomer dilithium represented by the formula, Li — (Bu)y — Li wherein Bu is a butadiene unit and y is an integer of 2 or more.

4. A sheet or film having an impact strength at −20°C of more than 30 kg·cm/cm² according to the method of DIN 53453 and a tensile strength of more than 200 kg·/cm² made from the block copolymer of claim 8.

5. A block copolymer according to claim 1, wherein the tensile strength of the block copolymer ranges from about 256 to 272 kg/cm², and the elongation ranges from 245 to 260%.

* * * * *